United States Patent [19]

Yanagisawa

[11] 4,326,229
[45] Apr. 20, 1982

[54] MAGNETIC RECORD MEMBER AND PROCESS FOR MANUFACTURING THE SAME

[75] Inventor: Masahiro Yanagisawa, Tokyo, Japan

[73] Assignee: Nippon Electric Co. Ltd., Tokyo, Japan

[21] Appl. No.: 102,731

[22] Filed: Dec. 12, 1979

[30] Foreign Application Priority Data

Dec. 19, 1978 [JP] Japan .................................. 53-160842

[51] Int. Cl.$^3$ .............................................. G11B 5/82
[52] U.S. Cl. .................................... 360/135; 427/130; 427/131; 427/132; 428/64; 428/332; 428/339; 428/450; 428/599; 428/631; 428/652; 428/680; 428/693; 428/694; 428/900; 428/928
[58] Field of Search ................ 427/128, 132, 130, 131; 248/900, 64, 332, 339, 450, 599, 631, 652, 680, 693, 694, 928; 360/135

[56] References Cited

U.S. PATENT DOCUMENTS

| | | |
|---|---|---|
| 3,055,770 | 9/1962 | Sankuer et al. .................. 427/131 X |
| 3,466,156 | 9/1969 | Peters et al. ...................... 427/131 X |
| 3,516,860 | 6/1970 | Simmons .......................... 427/131 X |
| 4,069,360 | 1/1978 | Yanagisawa et al. ........... 427/131 X |
| 4,124,736 | 11/1978 | Patel et al. ...................... 427/131 X |
| 4,133,911 | 1/1979 | Koester et al. .................. 427/128 X |
| 4,154,875 | 5/1979 | Yanagisawa et al. ........... 427/131 X |
| 4,171,399 | 10/1979 | Allen et al. ...................... 427/131 X |
| 4,188,434 | 2/1980 | Loran ............................... 427/131 X |

Primary Examiner—Bernard D. Pianalto
Attorney, Agent, or Firm—Fitzpatrick, Cella, Harper & Scinto

[57] ABSTRACT

An improved magnetic disk recording device having a smooth recording medium layer covered with a protective film layer whose surface is formed with radially extending sinusoidal jogs or undulations defining a surface roughness greater than that of the underlying recording medium. These jogs act to avoid wear due to the adhesiveness between the device and a recording or reproducing head. The jogged protective film layer is formed by using a solvent of specified boiling point in a spin-coating process.

10 Claims, 2 Drawing Figures

MAGNETIC RECORD MEMBER AND PROCESS FOR MANUFACTURING THE SAME

BACKGROUND OF THE INVENTION

1. Field of the Invention

This invention relates to improved magnetic record members for use in magnetic recording devices, such as magnetic disks and magnetic drums; and it also relates to a process for manufacturing the same.

2. Description of the Prior Art

In general, a magnetic recording device comprises a recording and/or reproducing head (hereinafter referred to as a "head") and a magnetic record member. One known type of recording and reproducing system used with such a device, is the contact-start-stop (CSS) system.

In the CSS system, a head is first placed in contact with the surface of a magnetic record member. Next, the record member is rotated at a predetermined speed to cause the head to raise up and "float" or "fly" above the record member on a thin layer of air which forms between the head and the record member surface. The desired recording or reproducing (record or playback) operation is then carried out while the head continues to float in this manner. When the recording or reproducing operation is terminated, the record member rotation is stopped and the magnetic head returns into contact with the record member surface.

The frictional force exerted between the head and the record member surface due to such mutual contact during starting and stopping operations causes wear to both the head and the record member, and may eventually damage the head and the magnetic recording medium layer of the record member so that recording and reproducing operations become impossible. Moreover, even a slight variation in the attitude of the head in such a state of frictional contact can impose a nonuniform load on the head that can damage the head and the record member.

Furthermore, large damaging frictional forces can be exerted between the head and the record member even during recording or reproducing operations, in cases where the floating head suddenly and unexpectedly contacts the surface of the record member.

In order to protect the head and the record member from such frictional contact, wear and breakdown, various protective films have been used to coat the surface of the record member.

Some of the heretofore proposed protective films have proven reasonably effective to protect against the types of frictional contact, wear and breakdown discussed above. However, depending on the environmental conditions under which such magnetic recording devices have been used, a large adhesiveness effect has been observed between the head and the record member surface which adversely affects the mechanical stability of the system.

In particular, the following general observations have been made regarding adhesiveness:

(1) Adhesiveness is produced by the presence of a liquid film between the head and the record member, and the amount of adhesiveness increases as the surface roughness of the head and the record member decreases.

(2) The liquid film producing the adhesiveness is formed on the surface of the head and record member when the head slides or runs on the record member surface; and the quantity of such liquid film is particularly large under high humidity conditions.

(3) In the CSS mode, the liquid film formed on the record member surface is scraped by the head so that the film may accumulate in the space between the head and the record member, thereby resulting in adhesiveness.

This adhesiveness effect causes a detrimental increase in the load on the record member drive motor and simultaneously increases the frictional force experienced during sliding of the head on the record member surface, thereby in some cases causing the breakdown of both the head and the record member.

Adhesiveness is a problem, especially with record members used in high-density magnetic data storage and retrieval applications. For such applications, the surface of the record member is highly polished to a smooth specular finish (i.e. a mirror surface) due to the necessity of minimizing the surface roughness of the recording medium layer so as to obtain the desired high-density recording or reproduction characteristics. The surface roughness of the protective film formed on such a specular recording medium layer using conventional methods is generally even smaller than the roughness of the recording medium layer. Hence, since adhesiveness increases as roughness decreases, a large adhesive force is exerted between the head and the record member which affects mechanical stability.

SUMMARY OF THE INVENTION

One aspect of the present invention involves a magnetic record member coated with a protective film having a surface roughness sufficiently large to prevent an increase in adhesiveness, yet maintaining the surface roughness of the recording medium layer low enough for the record member to still be suitable for high-density recording applications.

The present invention provides an improved magnetic record member and a process for manufacturing the same. The improved magnetic record member according to the invention comprises a base or substrate that includes a recording medium (hereinafter referred to as a "recording medium base") and which is further covered with a protective film whose surface roughness is greater than the surface roughness of the recording medium. The greater surface roughness of the protective film is obtained by forming the protective film with jogs or undulations distributed over its surface. In a preferred embodiment, the magnetic record member is a magnetic disk having a recording medium with a smooth mirrorlike surface. In operation, data will be recorded along a predetermined recording path on said recording medium surface. The surface of the protective layer includes jogs or undulations that have directivity extending transversely of said recording path. The preferred undulations are sinusoidal jogs which extend radially between the inner and outer circumferences of the disk.

A further aspect of the invention involves the formation of a magnetic record member by covering a recording medium base with a solution of coating material using a spin-coating process to form a protective coating having a jogged surface. Solvents having a boiling point of 70° C. to 100° C. are selected for use in the spin-coating process. The sinusoidal jogs in the preferred structure are formed by means of surface tension exerted during the spin-coating process, with the characteristics of the jogs being determined by the solvents used and the speed of rotation during spin-coating.

Use of a protective coating having a surface roughness of 0.02 to 0.05 microns and sinusoidal undulations distributed at a pitch of 10 to 200 microns serves to prevent an increase in adhesiveness and thus to reduce wear of the record member in contact with the head.

BRIEF DESCRIPTION OF THE DRAWINGS

By way of example of the many features and advantages of the invention, an illustrative embodiment in the form of a magnetic disk is described below and shown in the accompanying drawings, in which.

DETAILED DESCRIPTION OF THE PREFERRED EMBODIMENT

Figure 1:
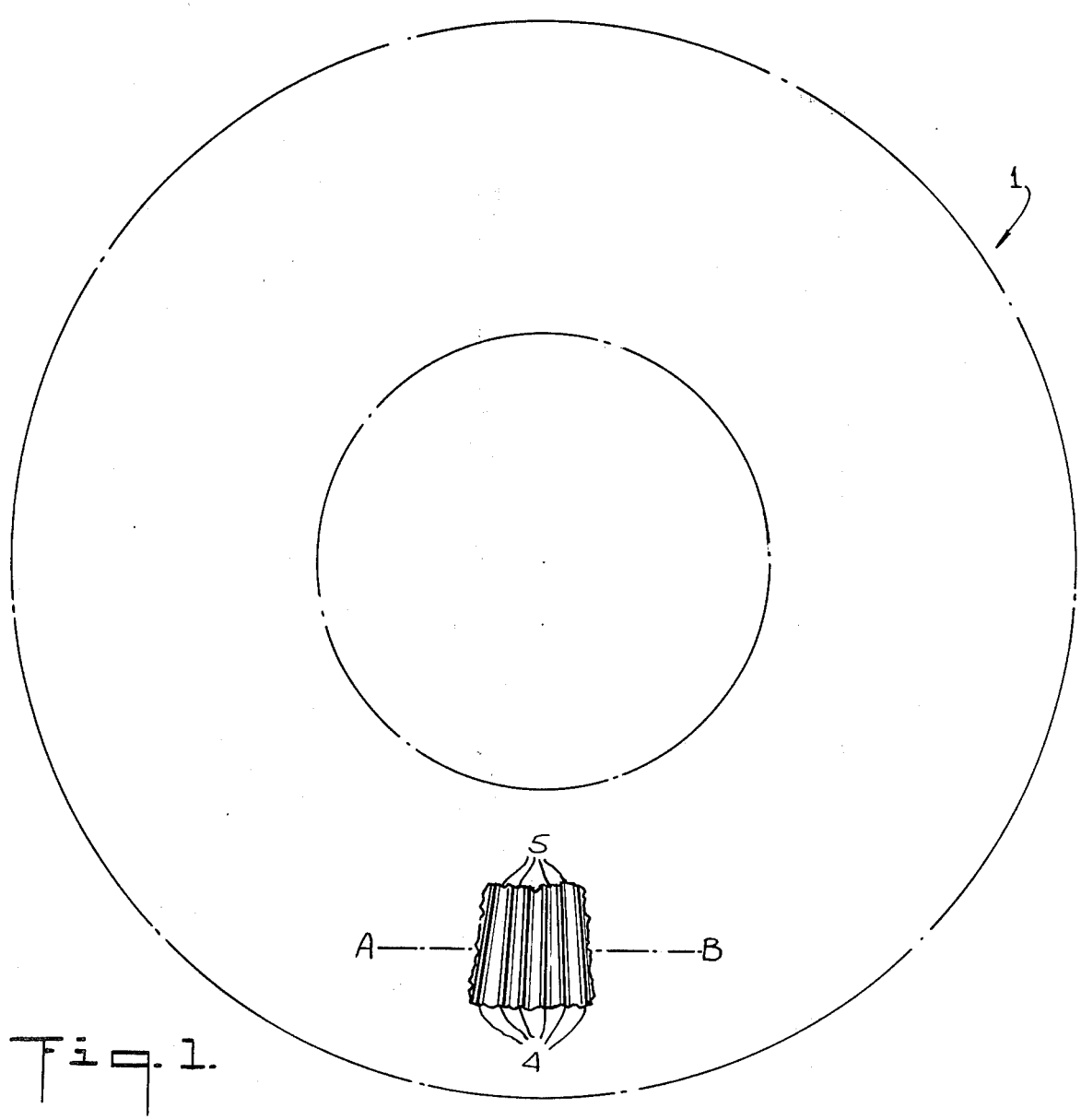
FIG. 1 shows a top planar view of a magnetic disk with the inner and outer circumferences shown in phantom outline and the details of an enlarged portion thereof shown in solid lines.

As shown in the drawings, a record member of the present invention is illustrated as embodied in a magnetic disk 1 for recording and retrieving data stored in magnetic form, such as, for example, digital data stored for use in a data processing system.

Figure 2:
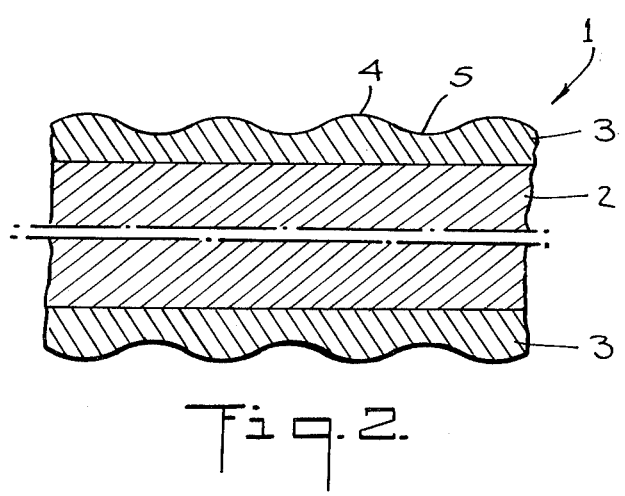
FIG. 2 shows a section view taken along the line A–B of FIG. 1 and looking toward the center of the disk.

As shown in FIG. 2, the illustrated record member 1 comprises a recording medium base or substrate 2 and a protective film 3.

The protective film is formed to have surface jogs or undulations defining a protective film surface roughness greater than that of the recording medium surface.

As shown in FIGS. 1 and 2, the recording medium base 2 has a mirrorlike finish and the surface of the protective film 3 is formed with radially extending sinusoidal jogs. Since line A–B of FIG. 1 generally follows the recording path of the disk, the drawings illustrate that the jogs have directivity transversely of the recording path. In other words, the jogs are oriented such that a recording or reproducing head positioned above the disk 1 will encounter successive jogs as the disk rotates. The surface of the protective film 3 showing the jogs can be seen in FIG. 1, wherein reference numeral 4 represents the tops or crests of each jog, and reference numeral 5 represents the bottoms or valleys thereof, respectively.

The base 2 includes a recording medium comprising a magnetic-metal thin film whose surface roughness is selected to be such that the recording and reproduction characteristics are good. It is desirable that the base have a small undulatory tolerance, i.e. degree of flatness, not to exceed 50 microns in the circumferential direction or 100 microns in the radial direction and have a small recording medium surface roughness of less than 0.02 microns in order to attain satisfactory recording and reproduction characteristics. (This tolerance can be measured, for example, using a TALYSTEP measuring device from Taylor Hobson Company of Leicester, England.)

The base 2 may be a disk whose surface is coated with a recording medium comprising a magnetic-metal thin film (as disclosed in U.S. Pat. No. 4,162,350), or a disk which comprises a recording medium of a magnetic-metal thin film coated with a non-magnetic alloy, or a disk whose surface is coated with a chemically treated layer (as disclosed in commonly assigned, copending patent application U.S. Ser. No. 47,916, filed June 12, 1979).

The protective film 3 is thin and has a surface with radially extending sinusoidal jogs. The film 3 may comprise a polysilicate (as disclosed in U.S. Pat. No. 4,162,350), a polysilicate with a pretreated layer (as disclosed in U.S. Pat. No. 4,152,487), a polysilicate containing a hydrolysis polymer of metal alkoxide or a stress relaxation agent (as disclosed in U.S. Pat. No. 4,152,487), or an amorphous inorganic oxide having an oriented lubricant on its surface (as disclosed in U.S. Pat. No. 4,069,360).

In order to prevent the occurrence of adhesiveness between the head and the record member surface, the surface jogs of the protective film 3 should have a pitch of from 10 to 200 microns and a surface roughness of from 0.02 to 0.05 microns ("pitch" being the circumferential distance between adjacent tops 4 or bottoms 5 at the inner circumference of the disk, also measurable, for example, with the TALYSTEP device; and "surface roughness" being the difference between the distances from the surface of base 1 to the tops 4 and to the bottoms 5, respectively, of the jogs). This ensures smooth contact of the head with the sinusoidal jogs and thus reduces wear.

If the surface roughness of the protective film is equal to or less than that required by the recording medium base for good recording and reproduction characteristics, undesirable adhesiveness between the head and the magnetic record member surface is liable to occur. On the other hand, if the surface roughness of the protective film is excessively large, the characteristics of the head to "fly" or "float" on the air layer above the record member are affected.

In order to obtain a protective film 3 having a surface of suitable pitch and roughness in accordance with the invention, a solvent with a boiling point of from 70° C. to 100° C. (degrees Centigrade) is selected in the coating solution used to form the film. Solvents usable for this purpose are alcohols such as methyl alcohol, ethyl alcohol, isopropyl alcohol, normal propyl alcohol, tertiary butyl alcohol or secondary butyl alcohol; esters such as methyl acetate, ethyl acetate, isopropyl acetate or methyl propionate; and ketones such as acetone, ethyl methyl ketone, or isopropyl methyl ketone.

Although the surface of a protective film polished with grains has no surface roughness directivity, there does exist directivity on a protective film surface prepared in accordance with this invention by the use of the above solvents. More specifically, applying the protective film to the disk by means of a spin-coating process (such as generally described in U.S. Pat. No. 4,154,875) using a solvent as described above, produces over the surface of the disk continuous and adjacent sinusoidal jogs whose tops 4 and bottoms 5 extend radially of the disk, and which have a pitch of 10 to 200 microns. Since surface tension is exerted during the spin-coating process to form the sinusoidal jogs, they are rendered uniform in size and thus do not adversely influence the flying stability of the head. Furthermore, since contact of the head with the magnetic device surface will only be with the tops of the jogs on the surface of the protective film, adhesiveness and wear are both avoided.

Hereinafter the record member according to this invention and a process for making the same are described in more detail with reference to the following examples:

EXAMPLE 1

A disk-shaped aluminum alloy base was finished to a surface having a flat topography (with an undulatory tolerance of less than 50 microns in the circumferential direction and less than 10 microns in the radial direction) by turning and heat-flattening processes. The aluminum alloy base was plated with a non-magnetic alloy of nickel-phosphorus (Ni-P) to a thickness of 50 microns to form a non-magnetic alloy layer. The surface of the non-magnetic alloy layer was then finished by mechanical polishing to obtain a specular surface having a roughness of less than 0.02 microns and a thickness of about 30 microns. A magnetic metal alloy layer of cobalt-nickel-phosphorus (Co-Ni-P) was then plated over the non-magnetic alloy layer to a thickness of about 0.05 microns. Subsequently, the Co-Ni-P layer thus formed was coated by means of a spin-coating method with a solution of the following composition:

tetrahydroxysilane 11% isopropyl alcohol solution—14% by weight
isopropyl alcohol—86% by weight In the spin-coating process, the disk was rotated in a horizontal plane about its axis at a speed of between 50 and 500 r.p.m. (revolutions per minute). The solution was supplied from its vessel onto the surface of the disk, so that the solution was spread outward on the disk surface by a centrifugal force while wetting the same. With the evaporation of the solvent (i.e. isopropyl alcohol) contained in the solution thus spread on the disk surface, a layer of polysilicate having radially extending sinusoidal jogs was formed thereon. The polysilicate layer had a thickness of 0.1 microns (this being the average of the thicknesses between the underlayer surface and the tops and bottoms of the jogs respectively). After being thus coated with the polysilicate layer, the disk was baked at 200° C. for three hours in an electric furnace to produce a magnetic record member.

By means of the above process, the resulting magnetic record device comprised a recording medium base covered with a protective film whose surface roughness was 0.04 microns with sinusoidal jogs extending radially toward the periphery of the record member and arrayed in the circumferential direction at a pitch of 80 microns (measured at the inner circumference).

EXAMPLE 2

A magnetic record member was produced in a manner similar to that of Example 1, except that a solution of the following composition was used instead of the foregoing one:

tetrahydroxysilane 11% ethyl alcohol solution—14% by weight
ethyl alcohol—86% by weight By means of the above process, the resulting magnetic record device comprised a recording medium base covered with a protective film whose surface roughness was 0.05 microns with sinusoidal jogs extending radially toward the periphery of the record member and arrayed in the circumferential direction at a pitch of 200 microns (measured at the inner circumference).

EXAMPLE 3

A magnetic record member was produced in a manner similar to that of Example 1, except that a solution of the following composition was used instead of the foregoing ones:

tetrahydroxysilane 5.6% ethyl alchol solution—27% by weight
secondary butyl alcohol—73% by weight By means of the above process, the resulting magnetic record device comprised a recording medium base covered with a protective film whose surface roughness was 0.02 microns with sinusoidal jogs extending radially toward the periphery of the record member and arrayed in the circumferential direction at a pitch of 60 microns (measured at the inner circumference).

EXAMPLE 4

A magnetic record member was produced in a manner similar to that of Example 1, except that a solution of the following composition was used instead of the foregoing ones:

tetrahydroxysilane 5.6% methyl alcohol solution—27% by weight
ethyl acetate—73% by weight By means of the above process, the resulting magnetic record device comprised a recording medium base covered with a protective film whose surface roughness was 0.05 microns with sinusoidal jogs extending radially toward the periphery of the record member and arrayed in the circumferential direction at a pitch of 100 microns (measured at the inner circumference).

EXAMPLE 5

A magnetic record member was produced in a manner similar to that of Example 1, except that a solution of the following composition was used instead of the foregoing ones:

tetrahydroxysilane 5.6% isopropyl alcohol solution—27% by weight
acetone—73% by weight By means of the above process, the resulting magnetic record device comprised a recording medium base covered with a protective film whose surface roughness was 0.05 microns with sinusoidal jogs extending radially toward the periphery of the record member and arrayed in the circumferential direction at a pitch of 50 microns (measured at the inner circumference).

EXAMPLE 6

In a manner similar to that of Example 1, a cobalt-nickel (Co-Ni) magnetic alloy layer was formed and plated with a nickel-phosphorus (Ni-P) non-magnetic alloy layer to a thickness of 200 angstroms. The disk thus plated with the alloy layers was then immersed in a Solution I of a composition described below for 30 seconds, and, after rinsing and drying, a chemically treated layer was formed thereon.

Solution I:
chromic acid anhydride—0.5% by weight
sodium hydrosulfuric acid—2.0% by weight
water—97.5% by weight Subsequently, the chemically treated layer was coated with a Solution II of a composition described below by the spin-coating method to form a protective film on the disk surface in a manner similar to that of Example 1.

Solution II:
tetrahydroxysilane 5.6% isopropyl alcohol solution—27% by weight
isopropyl alcohol—73% by weight The protective film was then further coated by the spin-coating method with an n-butyl alcohol solution containing hexamethyldisilazane 0.1% by weight, and the whole device was then baked at 200° C. for three hours to produce a magnetic record member.

By means of the above process, the resulting magnetic record device comprised a recording medium base covered with a protective film whose surface roughness was 0.04 microns with sinusoidal jogs extending radially toward the periphery of the record member and arrayed in the circumferential direction at a pitch of 80 microns (measured at the inner circumference).

Comparative Example 1

A disk having a cobalt-nickel-phosphorus (Co-Ni-P) magnetic alloy layer formed in a similar manner to that of Example 1 was coated with silicon dioxide ($SiO_2$) glass by means of a sputtering method to form a protective film having a thickness of 0.1 microns.

The resulting magnetic record device comprised a recording medium base covered with a smooth protective film having a surface roughness of 0.005 microns.

Comparative Example 2

A magnetic record member was produced in a manner similar to that of Example 1 using a spin-coating process, except that a solution of the following composition was used instead of the foregoing ones:
  tetrahydroxysilane 5.6% n-butyl alcohol solution—27% by weight
  n-butyl alcohol—73% by weight The solvent used did not have a boiling point between 70° C. and 100° C. (the boiling point of n-butyl alcohol is 118° C.). The resulting magnetic record device comprised a recording medium base covered with a smooth protective film having a surface roughness of 0.005 microns.

Radially extending sinusoidal jogs were formed on the protective film surface in Examples 1 through 6 but no such jogs were formed in Comparative Examples 1 and 2.

Among the parameters influencing the formation of the jogs are the selection of the solvent and the rotational speed of the spin-coating process. More specifically, these parameters influence the shape, pitch and surface roughness of the jogs.

The speed of rotation of the disk is normally selected to be between 50 and 500 r.p.m. (revolutions per minute). In accordance with the principles of the inventive process, pitches of 200 microns and 10 microns and surface roughnesses of 0.05 microns and 0.02 microns have been obtained on magnet record members using spin-coating rotational speeds of 50 and 500 r.p.m., respectively.

The solvent is preferably an alcohol, ester, ketone or a mixture thereof, having a boiling point from about 70° C. to about 100° C.

Use of a spin-coating process for applying the protective film contributes to the directivity or orientation of the jogs and to uniform radial distribution. This uniformity contributes to mechanical stability of the flying head by minimizing interference with the air layer on which the head rides. By way of explanation, the head is presented with a continuous regular waveform surface as it floats above the disk with alternating radially extending crests and valleys passing beneath it.

Using the record members obtained in Examples 1 through 6 and Comparative Examples 1 and 2, the tangential resistance force exerted between each record member and a head of a magnetic disk device was measured at the beginning and end of CSS test cycles repeated 30,000 times under conditions of 80% humidity and 20° C. temperature. The weight of the head at rotation start time was 10 grams.

No adverse effect was produced on the recording and reproducing characteristics as a result of tests conducted on the magnetic record devices of either Examples 1 through 6 or Comparative Examples 1 and 2. However, the increase in the tangential force exerted was significantly different.

According to the experimental results obtained from such tests, the tangential resistance force exerted between the head and the record member of each of Examples 1 through 6 was about 2 grams at the beginning of the CSS test cycles and was about 10 grams after the test cycles had been repeated 30,000 times. As for Comparative Examples 1 and 2, the tangential resistance force was about 3 grams at the beginning of the CSS test cycles but indicated an increased value of 50 grams after 30,000 test cycles.

Furthermore, the head which contacted the record member of Comparative Example 1 was observed to have many scars and also some wear was perceived. While the heads which contacted the record members of Examples 1 through 6 showed no signs of unfavorable change at all.

Thus, these experiments show that for record members such as those of Examples 1 through 6 with sinusoidal jogs, the increase in tangential resistance force exerted in the CSS system is slight even under high-humidity conditions, thereby minimizing the motor load that results from an increase in the starting torque of a magnetic disk device. Moreover, magnetic record devices made in accordance with the principles of Examples 1 through 6 permit enhancement of reliability with respect to the slide contact between the head and the record member.

From the foregoing it will be appreciated that with the magnetic record member and the process for manufacturing the same as described herein, high-density recording under high-humidity conditions can be achieved while minimizing wear and damage to the head and record members without increasing the adhesiveness between the head and record member.

What is claimed is:

1. A magnetic record member comprising:
   a disk-shaped recording medium base having a specular magnetic recording medium surface; and
   a protective film formed on said base and having a surface roughness of 0.02 to 0.05 microns with sinusoidal jogs which are distributed at a pitch of 10 to 200 microns and extend radially between the inner and outer circumferences of said base.

2. A magnetic record member as defined in claim 1, wherein said base comprises an aluminum alloy disk, a nickel-phosphorous alloy layer formed thereon, and a cobalt-nickel-phosphorous alloy layer formed on said nickel-phosphorous alloy layer and serving as a recording medium.

3. A process for manufacturing a magnetic record member comprising the steps of:
   covering a recording medium base having a specular magnetic recording medium surface with a solution of coating material composition including a solvent of a boiling point of 70° C. to 100° C. by a spin-coating process, thereby to form a protective film on said base; and
   controlling the spin rate of the recording medium base to a rate at which radially extending jogs are produced on the surface of said protective film which are distributed at a pitch of 10 to 200 microns and which form a surface roughness of 0.02 to 0.05 microns.

4. A process for manufacturing a magnetic record member as defined in claim 3, wherein said solvent of a boiling point of 70° C. to 100° C., is selected from the group consisting of methyl alcohol, ethyl alcohol isopropyl alcohol, normal propyl alcohol, tertiary butyl alcohol, secondary butyl alcohol, methyl acetate, ethyl acetate, isopropyl acetate, methyl propionate, acetone, ethyl methyl ketone, and isopropyl methyl ketone.

5. A process for manufacturing a magnetic record member as defined in claim 3, wherein said solution of coating material composition comprises a tetrahydroxysilane solution.

6. A magnetic record member comprising a recording medium base having a smooth magnetic recording medium surface suitable for high density recording, and a protective film covering said smooth surface, said protective film itself having a surface with a roughness greater than the surface roughness of said recording medium surface the surface roughness of said protective film being characterized by sinusoidal jogs, said base being disk-shaped and said jogs extending radially between the inner circumference of the base and the outer circumference of the base.

7. A magnetic record member as defined in claim 6, wherein the surface roughness of said protective film has a directivity extending transversely of the recording path.

8. A magnetic record member as defined in claim 6, wherein said radially extending jogs have a pitch of from about 10 to about 200 microns at the inner circumference of the disk-shaped base.

9. A magnetic record member as defined in claim 6, wherein the surface roughness of said protective film surface is from about 0.02 to about 0.05 microns.

10. In a spin-coating process for forming a protective coating on a disk-shaped magnetic recording medium base having a recording medium surface roughness of a thickness less than 0.02 microns, an improvement comprising the steps of depositing onto said base a solution of coating material comprising a solvent having a boiling point of about 70° C. to about 100° C.; and controlling the spin rate of the recording medium base to a rate at which a protective film is formed whose surface is characterized by radially extending jogs defining a protective film surface roughness which is greater than the surface roughness of the underlying recording medium and equal to or less than 0.05 microns.

* * * * *